United States Patent Office 3,573,274
Patented Mar. 30, 1971

3,573,274
AZO DYE FROM COUPLING DIAZOTIZED SODIUM S-4 - AMINOPHENYLTHIOSULFATE AND ACETOACET-p-ANISIDIDE
Frederick E. Barwick III, 115 Sedgwick Terrace, Charlotte, N.C. 28214
No Drawing. Filed Aug. 13, 1968, Ser. No. 752,171
Int. Cl. C07c 107/04; C09b 29/32
U.S. Cl. 260—193                1 Claim

ABSTRACT OF THE DISCLOSURE

An azo dye of the formula

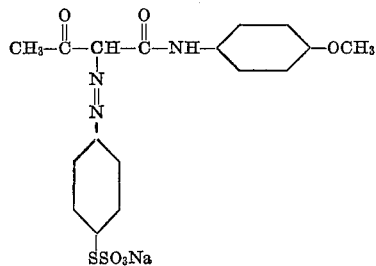

and method for making same by coupling equimolar amounts of diazotized sodium S-4-aminophenylthiosulfate and acetoacet-p-anisidide.

---

The present invention relates to an azo dye and to the method for making same.

The dye of the present invention may be represented by the structural formula

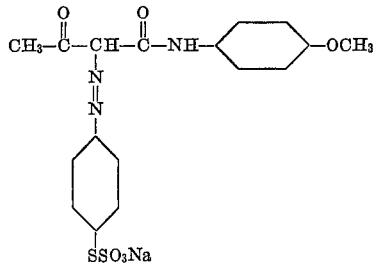

The method of the present invention is particularly characterized in that the dye of the above structural formula may be prepared by coupling equimolar amounts of diazotized sodium S-4-aminophenylthiosulfate and acetoacet-p-anisidide.

The dye of the present invention is particularly useful for dyeing cotton and regenerated cellulose textiles to a bright greenish yellow shade.

The dye of the present invention has surprisingly strong tinctorial power. For example, the dye of the present invention has about 54% greater tinctorial power than the structurally similar dye made by coupling equimolar amounts diazotized sodium S-4-aminophenylthiosulfate and acetoacet-o-anisidide.

Surprisingly, the dye of the present invention also has considerably less sensitivity to Glauber's salt than the structurally similar dye made by coupling equimolar amounts diazotized sodium S-4-aminophenylthiosulfate and acetoacet-o-anisidide. This is an important property, as yellow azothiosulfate dyes are frequently dyed in mixture with certain other thiosulfate dyes of the non-sulfur dyestuff series, and Glauber's salt is customarily added to the dye pad bath as an anti-migration agent for these other thiosulfate dyes. Glauber's salt inhibits some thiosulfate dyes from going into solution in the dye pad bath, and causes weaker dyeings. For example, if a dyeing be made using 3.35 oz. of the dye of the present invention and 4 oz. Glauber's salt per gallon of dye pad liquor, there is only a slight loss of dyeing strength due to the presence of the Glauber's salt. However, if a dyeing be made using 4 oz. Glauber's salt and 3.35 oz. of the dye resulting from coupling equimolar amounts of diazotized sodium S-4-aminophenylthiosulfate and acetoacet-o-anisidide per gallon of dye pad liquor, there is about a 50% loss of dyeing strength due to the presence of the Glauber's salt.

Surprisingly, the dye of the present invention has substantially better money value as a dye for cotton fabric than the dye resulting from coupling equimolar amounts of diazotized sodium S-4-aminophenylthiosulfate and acetoacet-o-anisidide or the dye resulting from coupling equimolar amounts diazotized sodium S-4-aminophenylthiosulfate and acetoacet-2',5'-dimethoxyanilide. For example, if equal money value amounts of these three dyes (in which money value is computed on the basis of cost of dye production) are applied separately to cotton fabric, producing three dyeings, the dyeing made from the dye of the present invention is substantially tinctorially stronger than either of the remaining two dyeings.

In the following illustrative examples, all parts are by weight unless otherwise specified.

EXAMPLE 1

The azo dye of the formula

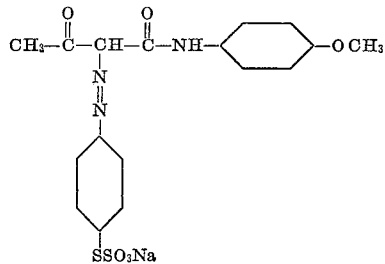

may be prepared as follows.

One g. M.W. of sodium S-4-aminophenylthiosulfate is diazotized as follows. Add 1.4 liters $H_2O$ to 227 gms. sodium S-4-aminophenylthiosulfate, heat to 65° C. to dissolve, and cool to less than 10° C. Gradually add thereto 220 ml. 32% aqueous HCl while maintaining temperature at less than 10° C. While maintaining temperature at less than 10° C., gradually add thereto 20% aqueous $NaNO_2$ until positive to starch-KI paper; about 315 ml. 20% aqueous $NaNO_2$ will be required. Excess nitrous acid is removed from the resulting diazo by adding a few mgs. sulfamic acid until negative to starch-KI paper. Maintain the diazo at 5° C.

Add 1.5 liters $H_2O$ at room temperature to 207 gms. (1 g. M.W.) acetoacet-p-anisidide. Add 80 gms. 50% aqueous NaOH and stir until solution results. Add 5% aqueous acetic acid until the mixture shows neutral on thiazole test paper, about 1 liter of 5% aqueous acetic acid being required. Add 1 liter 21.2% aqueous $Na_2CO_3$. Cool to 5°–10° C., and then, gradually and during a period of 1 hour, add thereto the above diazo while maintaining a temperature of 5°–10° C. Stir for 3–4 hours to precipitate the dye, and recover by filtration.

The following is an example of making a dyeing with the dye of the present invention.

EXAMPLE 2

Onto mercerized cotton fabric weighing 112 gms. per square yard is padded a dye composition containing 25 gms. of the dye of Example 1 and 90 gms. urea per liter of water at 160° F.; the fabric is squeezed to 60% wet pick up based on fabric weight; predried to substantial dryness; padded through an aqueous solution consisting of 6.05 gms. $Na_2S_4$ and 200 gms. NaCl per liter of water at room temperature; squeezed to 60% wet pick up based on fabric weight; exposed to the air for 30 seconds; washed with water at room temperature; soaped at the boil; rinsed with water and dried. The resulting bright greenish yellow dyeing has excellent fastness to No. 3 AATCC wash test, excellent dry crock fastness, very good wet crock fastness, and commercially acceptable light fastness.

What is claimed is:
1. The dye of the formula

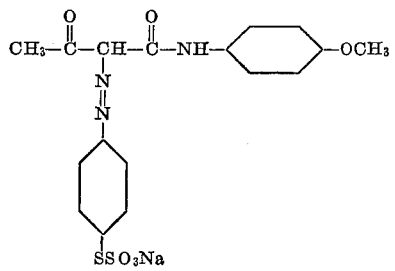

References Cited
UNITED STATES PATENTS
3,367,929  2/1968  Wagoner _____ 260—19.3

CHARLES B. PARKER, Primary Examiner
C. F. WARREN, Assistant Examiner

U.S. Cl. X.R.
8—50, 51